(12) United States Patent
Chapman (10) Patent No.: US 11,309,606 B2
(45) Date of Patent: Apr. 19, 2022

(54) BATTERY PACK ASSEMBLY FOR CAMERA CRANE AND EQUIPMENT

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: CHAPMAN/LEONARD STUDIO EQUIPMENT, INC., North Hollywood, CA (US)

( * ) Notice: Subject to any disclaimer, the term of this patent is extended or adjusted under 35 U.S.C. 154(b) by 403 days.

(21) Appl. No.: 16/556,801

(22) Filed: Aug. 30, 2019

(65) Prior Publication Data

US 2021/0066681 A1 Mar. 4, 2021

(51) Int. Cl.

| H02J 7/00 | (2006.01) |
|---|---|
| H01M 50/20 | (2021.01) |
| B60R 11/04 | (2006.01) |
| B60P 3/28 | (2006.01) |
| B66F 11/04 | (2006.01) |
| G03B 17/02 | (2021.01) |
| G03B 17/56 | (2021.01) |
| B60R 11/00 | (2006.01) |

(52) U.S. Cl.
CPC ............ *H01M 50/20* (2021.01); *B60P 3/28* (2013.01); *B60R 11/04* (2013.01); *B66F 11/048* (2013.01); *G03B 17/02* (2013.01); *G03B 17/561* (2013.01); *H02J 7/0027* (2013.01); *H02J 7/0042* (2013.01); *B60R 2011/004* (2013.01); *B60R 2011/0084* (2013.01)

(58) Field of Classification Search
CPC ........................................................ H02J 7/00
See application file for complete search history.

(56) References Cited

U.S. PATENT DOCUMENTS

| 3,168,284 A | 2/1965 | Fisher |
| 4,360,187 A | 11/1982 | Chapman |
| 4,943,019 A | 7/1990 | Mester |
| 4,950,126 A | 8/1990 | Fabiano et al. |
| 5,037,068 A | 8/1991 | Grottesi |
| 5,121,200 A | 6/1992 | Choi |
| 5,197,700 A | 3/1993 | Chapman |
| 6,053,476 A | 4/2000 | Chapman |
| 6,109,626 A | 8/2000 | Chapman |
| 6,135,465 A | 10/2000 | Chapman |
| 6,280,170 B1 | 8/2001 | Furuya et al. |
| 6,626,117 B1 | 9/2003 | Chapman |
| 7,128,479 B2 | 10/2006 | Chapman |
| 8,465,103 B2 | 6/2013 | Burt et al. |
| 8,550,632 B2 | 10/2013 | Chapman |
| 8,727,318 B2 | 5/2014 | Chapman |

(Continued)

*Primary Examiner* — Robert Grant
(74) *Attorney, Agent, or Firm* — Perkins Coie LLP; Kenneth H. Ohriner (57) ABSTRACT

A vehicle for carrying a camera crane has wheels or treads on a chassis. A battery pack assembly on the chassis, includes an AC to DC converter and plurality of batteries wired to a battery charger within a housing. The batteries collectively may have an output voltage of 30 to 36 VDC when fully charged. At least one input connector on the housing is wired to the AC to DC converter for charging the batteries. The battery pack assembly replaces and is used instead of a camera-equipment-generator.

11 Claims, 6 Drawing Sheets

(56) References Cited

U.S. PATENT DOCUMENTS

| | | | |
|---|---|---|---|
| 8,764,060 B2* | 7/2014 | Chapman | B66F 11/048 |
| | | | 280/763.1 |
| 8,870,197 B2 | 10/2014 | John | |
| 9,260,045 B2 | 2/2016 | Chapman | |
| 9,915,395 B2 | 3/2018 | Chapman | |
| 11,099,464 B2 | 8/2021 | Chapman | |
| 2005/0191050 A1 | 9/2005 | Chapman | |
| 2008/0264886 A1 | 10/2008 | Adamiec et al. | |
| 2009/0145696 A1 | 6/2009 | Bergmeier | |
| 2012/0051733 A1 | 3/2012 | Chapman | |
| 2012/0070143 A1 | 3/2012 | Chapman et al. | |
| 2013/0057212 A1* | 3/2013 | Feuell | H02J 7/0031 |
| | | | 320/109 |
| 2014/0015223 A1 | 1/2014 | Banwart | |
| 2015/0171632 A1* | 6/2015 | Fry | H02J 7/00036 |
| | | | 307/22 |
| 2015/0175182 A1 | 6/2015 | Chapman | |
| 2015/0309394 A1 | 10/2015 | Janze et al. | |
| 2016/0329731 A1 | 11/2016 | Kokot, Jr. | |
| 2017/0123296 A1 | 5/2017 | Chapman | |
| 2017/0222474 A1 | 8/2017 | Kefalos et al. | |
| 2019/0033691 A1 | 1/2019 | Li et al. | |

* cited by examiner

BATTERY PACK ASSEMBLY FOR CAMERA CRANE AND EQUIPMENT

BACKGROUND OF THE INVENTION

Camera cranes are used to position and maneuver motion picture cameras, such as motion picture film or digital cameras, HD cameras, and 2D and 3D cameras. Camera cranes typically have a crane arm mounted onto a mobile base or vehicle. Many camera cranes are self-propelled via an on-board motor. In addition, a camera crane may be placed onto a transport vehicle, such as described in U.S. Pat. No. 9,260,045 B2. So-called camera cars are custom modified vehicles, typically large pickup or utility trucks, equipped with a camera crane, pedestal, slider, or similar camera holding and moving apparatus. Camera crane tractors have also been developed for use on sand, mud, snow or other difficult terrain, such as described in U.S. Pat. No. 9,915,395 B2.

Operation of camera cranes, support vehicles, camera accessories and related equipment often requires significant electrical power. For example, many camera cranes have hydraulic systems which require recharging by an electrically powered pump. Support vehicles may be driven by electric motors. As a result, they are typically provided with an on board gasoline or diesel powered generator. While these designs have performed well in the past, disadvantages remain. Initially, even the quietest generators may create noise which interferes with filming. Gasoline or diesel engines require significant maintenance. They also of course consume fossil fuels and release exhaust emissions. Accordingly, improvements are needed.

SUMMARY OF THE INVENTION

In a first aspect, a vehicle for carrying a camera crane or other camera equipment includes a plurality of wheels or treads rotatably attached to a chassis. A battery pack assembly is provided on the chassis instead of a generator. The battery pack assembly includes an AC to DC converter and plurality of batteries wired to a battery charger within a housing. The batteries collectively have an output voltage of 30 to 36 VDC when fully charged. At least one input connector on the housing is wired to the AC to DC converter for charging the batteries. Each battery may have a 30 ampere hour capacity. The battery pack assembly provides electric power for camera equipment on or used with the vehicle.

In another aspect, a camera crane has a plurality of wheels rotatably attached to the chassis. A column is pivotally supported on the chassis and a crane arm is pivotally supported on the column. A battery pack assembly includes an AC to DC converter and plurality of batteries wired to a battery charger within a housing. The batteries have an output voltage of 30 to 36 VDC when fully charged. At least one an input connector on the housing is wired to the AC to DC converter for charging the batteries. The camera crane has no camera-equipment-generator, with all electrical power used by the camera crane provided at least indirectly from the battery pack assembly.

Other features and advantages will be apparent from the following detailed description, which is provided by way of example and is not intended as an explanation of the limits of the invention.

BRIEF DESCRIPTION OF THE DRAWINGS

In the drawings, the same reference number indicates the same element in each of the views.

DETAILED DESCRIPTION

Figure 1:
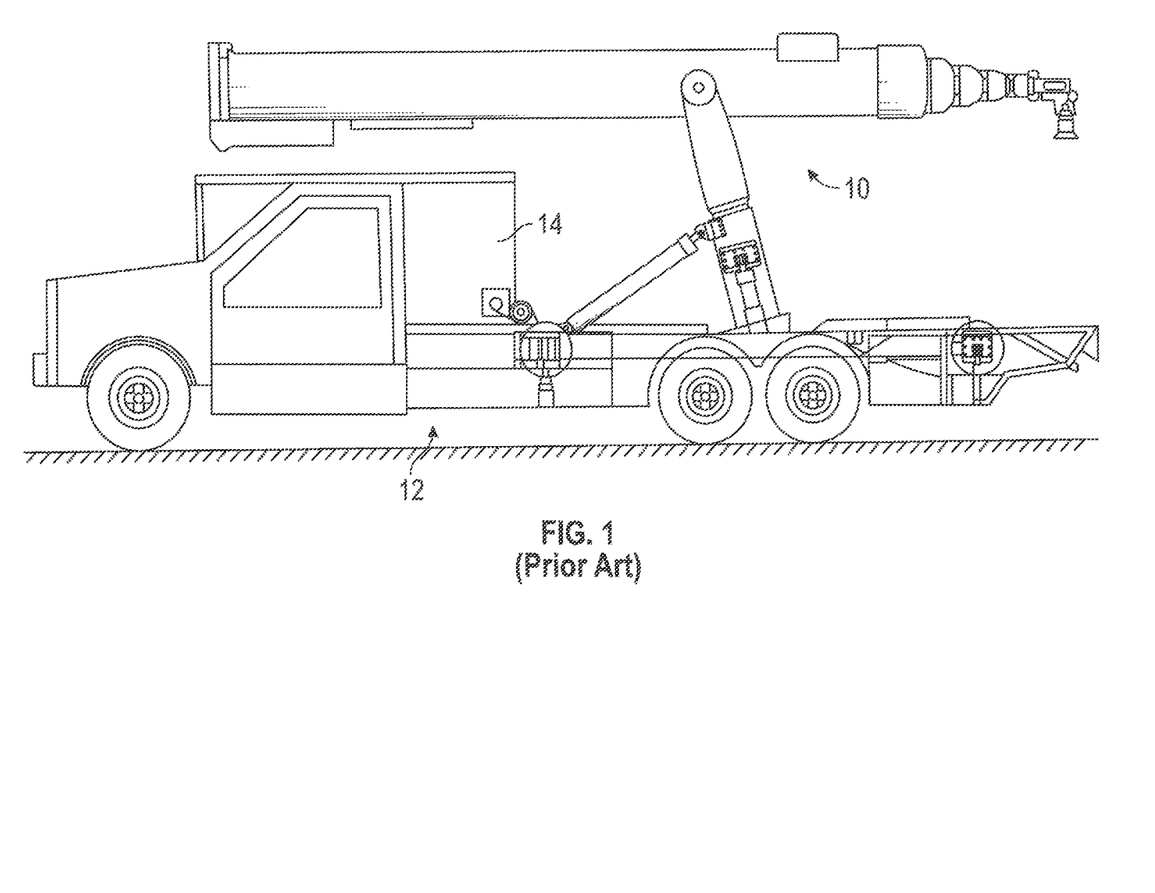
FIG. 1 is a side view of a prior art camera crane on a transport vehicle.
Figure 6:
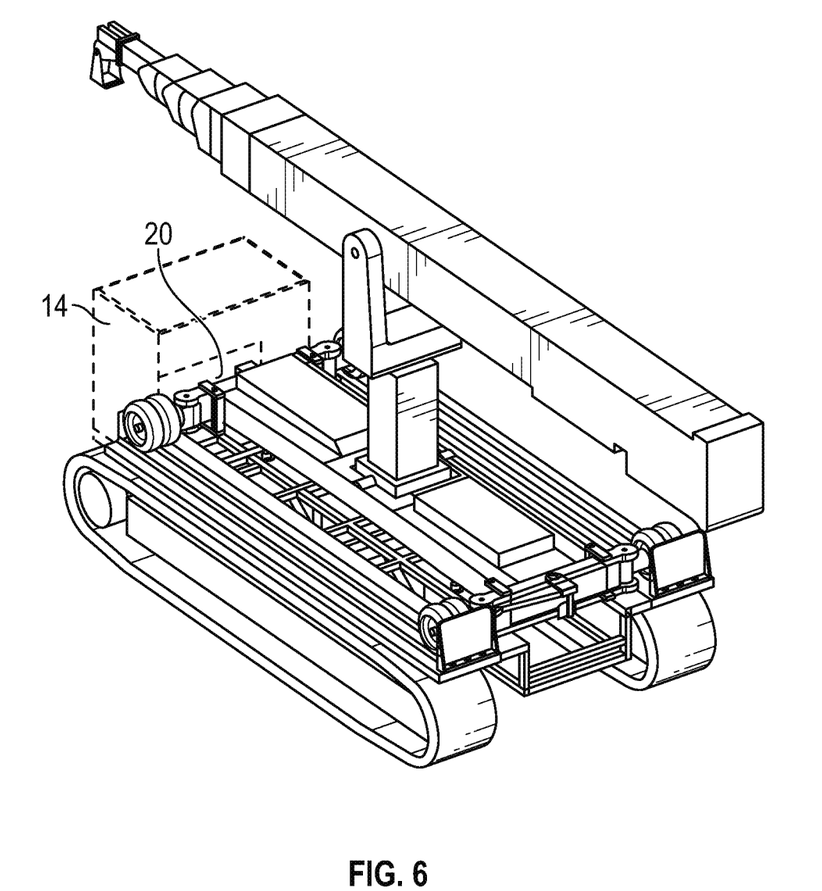
FIG. 6 is perspective view of the battery pack assembly of FIGS. 2-4 and a self-propelled camera crane on a tractor base.

As shown in FIG. 1 a camera crane 10 is supported on a transport vehicle 12 for using the camera crane 10 in over-the-road filming or to move the camera crane 10 to the filming location. An example of a camera crane 10 is described in U.S. Pat. No. 7,128,479, incorporated herein by reference. An example of a transport vehicle 12 is described in U.S. Pat. No. 9,260,045 B2, incorporated herein by reference. FIG. 6 shows an alternative transport vehicle having treads instead of ground wheels, as described in U.S. Pat. No. 9,915,395 B2, incorporated herein by reference. As shown in FIGS. 1 and 6 a camera-equipment generator 14 is typically provided on the transport vehicle. The camera-equipment generator 14 generally is large and heavy. The camera-equipment generator uses an internal combustion engine, which makes noise, consumes fuel and generates exhaust.

Figure 2:
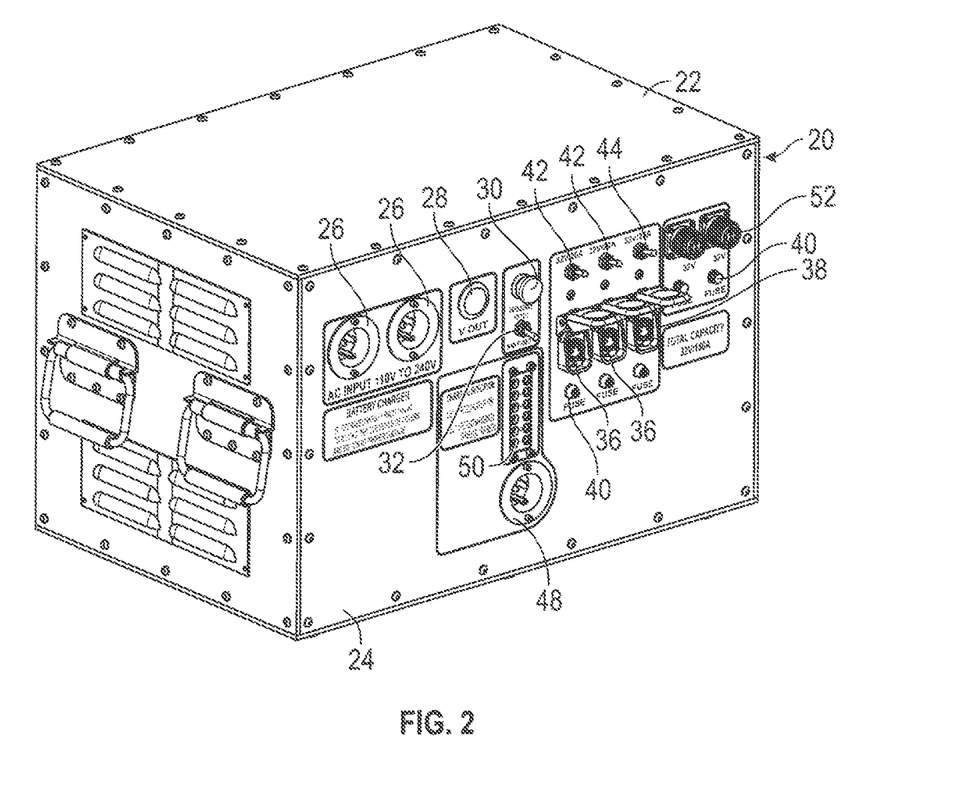
FIG. 2 is a perspective view of a battery pack assembly.
Figure 3:
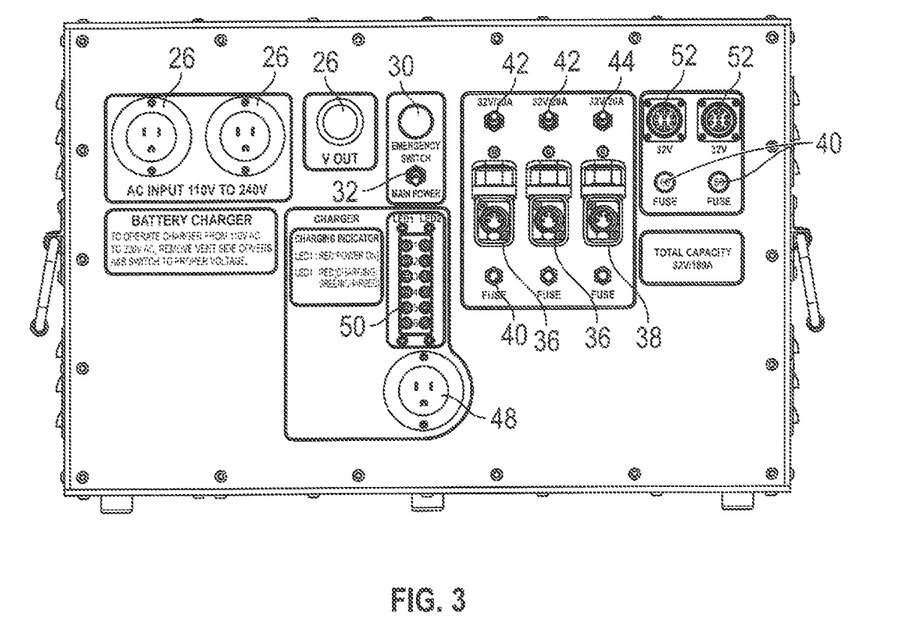
FIG. 3 is a front view of the battery pack assembly shown in FIG. 1.
Figure 4:
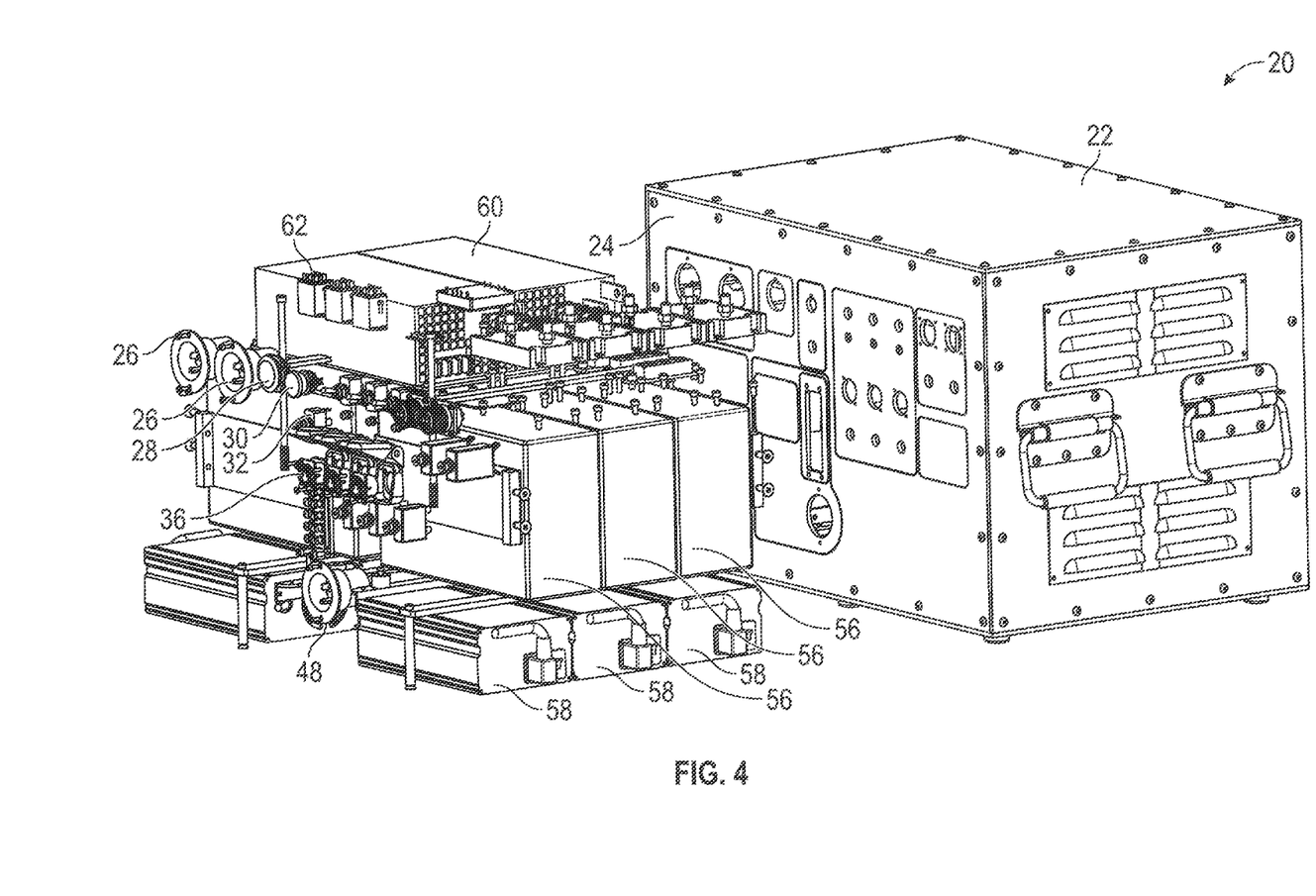
FIG. 4 is an exploded perspective view showing components of the battery pack assembly of FIGS. 2 and 3.
Figure 5:
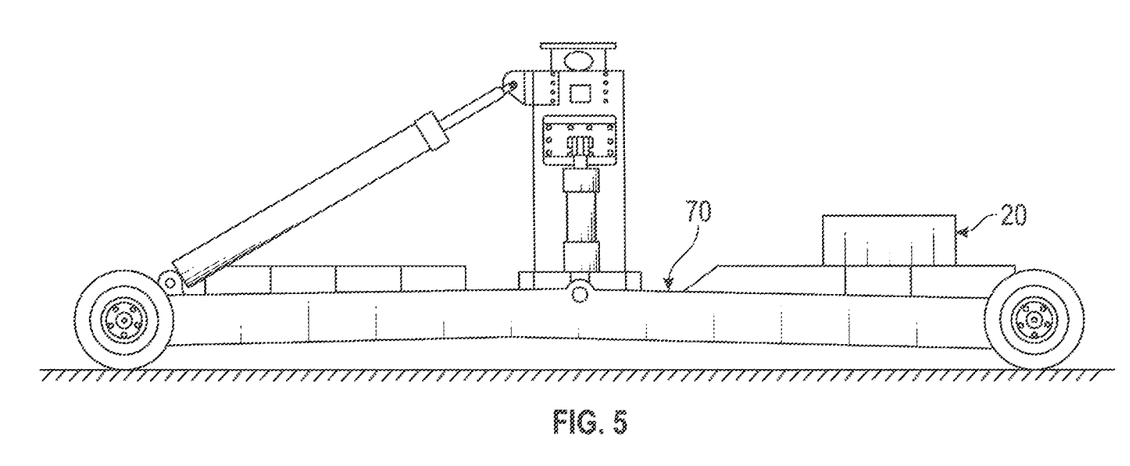
FIG. 5 is side view of the battery pack assembly of FIGS. 2-4 on a self-propelled camera crane.

In one aspect of the invention, the camera-equipment generator 14 is replaced by the battery pack assembly 20 shown in FIGS. 2-4. The battery pack assembly 20 avoids the need for the generator 14. The battery pack assembly 20 is much smaller and much lighter than the generator, while providing comparable electric power. For example, the housing 22 of the battery pack assembly 20 may have a length of 45 to 90 cm, a width of 38 to 76 cm, and a height of 38 to 76 cm. Referring momentarily to FIG. 6, the previously used generator 14 is schematically shown in dotted lines. The much smaller battery pack assembly 20 which replaces the generator 14 is shown in solid lines.

The battery pack assembly 20 may be light enough so that it can be lifted and carried by one or two film crew members, for example having a weight of 40-80 kg. For this purpose, handles may be provided on the sides of the housing 22. In some circumstances, wall current (typically 120 or 240 VAC) is available via a cable connected to facility electric power, or a remotely located but portable generator. In this case, it can be helpful to use the available wall current to operate the camera equipment. The wall current must be converted to the 24 or 32 VDC that most camera equipment operate on. It is also helpful to be able to charge batteries using wall current when available. As far as is known, no known battery equipment provides this capability while providing a 32 VDC output, and with a single conversion (from 120 or 240 VAC to 32 VDC), i.e., without the need for any intermediate conversions causing loss of efficiency. As used here, wall current means electric power provided from a fixed facility such as a building or other infrastructure, or the equivalent provided from a portable generator or battery facility.

As shown in FIG. 4, the battery pack assembly 20 has six 32 VDC lithium batteries 56 wired in parallel within the housing 22 of the battery pack assembly. Each battery 56 has a 30 ampere hour capacity for a total capacity of 180 ampere hours at 30 VDC continuous. Each battery is chargeable at 10 amps for 2.5 to 5 hours to 100% charge. A battery charger 58 is connected to each battery 56. Each of two AC to DC converters 60 is connected to three of the battery chargers 58.

Referring to FIGS. 2-4, a front panel 24 of the housing 22 of the battery pack assembly 20 has two AC input connectors 26 wired to the AC/DC converters. If available, wall current provided to either connector 26, is converted to 32 VDC, and is provided to output connectors on the front panel. In the example shown, two 32 VDC 60 amp connectors 52 are provided. These may be used for operating hydraulic pumps in large camera cranes, such as described in U.S. Pat. No. 7,128,479, which has two hydraulic pumps. As also shown in FIGS. 2-4, two additional output connectors 36 are similarly connected and provide 32 VDC 20 amp output for operating a camera, a remote camera head, and/or a camera crane nose levelling system. A fifth output connector 38 similarly provides a 12 VDC 20 amp output, typically used for a monitor display. On/off switches 42 and 44 switch the output connectors 36 and 38. Each output connectors 36, 38 and 52 has a resettable fuse 40. Of course, the number and output voltage of the output connectors may be varied to better meet specific uses. If external power is provided to the battery pack assembly 20 via either connector 26, the batteries 56 are automatically disconnected from the output connectors via relays 62.

A master power toggle switch 32 switches power on/off for the entire battery pack assembly 20. A push button master emergency shut-off switch 30 shuts off all power of the battery pack assembly 20 when activated. A voltmeter 28 displays the voltage at the output connectors. As shown in FIG. 3, an array of LED indicator lights 50 is provided on the front panel 24 of the housing 22 to display the charge status of each battery 56. The LEDs in the left column indicate whether external power is present at each battery. The LEDs in the right column indicate charging status, turning from red to green when the battery is fully charged. The batteries 56 are charged by supplying wall current to a charging connector 48 which is wired to the AC/DC converters 60.

In use, the batteries 56 in the battery pack assembly 20 are initially charged by connecting the battery pack assembly 20 typically to 110 VAC or 240 VAC wall current. A vent cover on a side of the housing may be removed to set a switch to either a 110 VAC position or a 240 VDC position, depending on the wall current available. With the batteries charged, the battery pack assembly 20 is then provided on or with the camera crane 10 or the transport vehicle 12. In most uses, the battery pack assembly 20 can provide enough power for the application. If additional power is needed for long duration uses or applications having intensive power consumption, the battery pack assembly 20 can be swapped out for a fresh fully charged battery pack assembly 20. Alternatively, the battery pack assembly 20 may be charged on site or in place, if wall current or equivalent power is available.

As described here, a vehicle having no camera-equipment-generator means having no gasoline or diesel powered generator for providing electrical power to camera equipment and accessories (such as a remote camera head; lighting; monitors and controls; internal electric motors, etc.). The typically belt-driven alternator provided as original equipment with the diesel or gasoline engine of a vehicle is not a camera-equipment generator. Consequently, a vehicle having no camera-equipment-generator may have, and most often will have, at least one alternator in the electrical system of the original equipment manufacture (OEM) vehicle.

Thus, novel camera equipment and a novel battery pack assembly have been shown and described. Various modifications and substitutions may of course be made, without departing from the spirit and scope of the invention. The invention, therefore, should not be limited, except by the following claims and their equivalents.

The invention claimed is:

1. A vehicle for carrying a camera crane, comprising:
   a chassis;
   a plurality of wheels rotatably attached to the chassis;
   a surface on the chassis for supporting a camera crane; and
   a battery pack assembly on the chassis, including an AC to DC converter and a plurality of batteries wired to a battery charger within a housing, the batteries wired to one or more output connectors and collectively having an output voltage of 30 to 36 VDC when fully charged, and at least one input connector on the housing wired to the AC to DC converter for charging the batteries, the battery pack wired so that wall current provided to the at least one input connector is converted to 30 to 36 VDC and is provided to the output connectors for powering camera equipment, and the batteries automatically disconnected from the output connectors via one or more relays when wall current is provided to the at least one input connector; and
   the vehicle having no camera-equipment-generator.

2. The vehicle of claim 1 with the battery pack assembly having six batteries, with each battery wired to a separate battery charger in the housing.

3. The vehicle of claim 1 with the battery pack assembly having a second output voltage of 12 VDC when fully charged.

4. A camera crane, comprising:
   a chassis;
   a plurality of wheels rotatably attached to the chassis;
   a column pivotally supported on the chassis;
   a crane arm pivotally supported on the column;
   a battery pack assembly on the chassis, the battery pack including an AC to DC converter and plurality of batteries wired to a battery charger within a housing, the batteries wired to one or more output connectors and collectively having an output voltage of 30 to 36 VDC when fully charged, and at least one an input connector on the housing wired to the AC to DC converter for charging the batteries, the battery pack wired so that wall current provided to the at least one input connector is converted to 30 to 36 VDC and is provided to the output connectors for powering camera equipment, and the batteries automatically disconnected from the output connectors via one or more relays when wall current is provided to the at least one input connector;
   the camera crane having no camera-equipment-generator, with all electrical power used by the camera crane provided at least indirectly from the battery pack assembly; and
   the battery pack assembly provided as an accessory, the battery pack assembly supported on a surface of the chassis, and the battery pack assembly removable from the chassis.

5. The camera crane of claim 4 with the battery pack assembly having six batteries, with each battery wired to a separate battery charger.

6. The camera crane of claim 4 with the battery pack assembly having a second output voltage of 12 VDC when fully charged.

7. The camera crane of claim 4 with the housing having a front panel including a pair of LED indicators associated with each battery, and wherein all of the input connectors and output connectors are on the front panel.

8. The camera crane of claim 4 with the battery pack assembly having a length of 45 to 90 cm, a width of 38 to 76 cm, and a height of 38 to 76 cm, further including a left handle on a left side of the housing and a right handle on a right side of the housing, for lifting and carrying the battery pack assembly.

9. The camera crane of claim 1 further including a diesel or gasoline engine on the chassis.

10. The camera crane of claim 1 further including a diesel or gasoline engine on the chassis driving an alternator.

11. Camera crane equipment, comprising:
   a chassis;
   a plurality of wheels rotatably attached to the chassis;
   a diesel or gasoline engine on the chassis;
   a battery pack assembly on the chassis, the battery pack including an AC to DC converter and plurality of batteries wired to a battery charger within a housing, the batteries wired to one or more output connectors and collectively having an output voltage of 30 to 36 VDC when fully charged, and at least one an input connector on the housing wired to the AC to DC converter for charging the batteries, the battery pack wired so that wall current provided to the at least one input connector is converted to 30 to 36 VDC and is provided to the output connectors for powering camera equipment, and the batteries automatically disconnected from the output connectors via one or more relays when wall current is provided to the at least one input connector;
   the camera crane having no camera-equipment-generator, with all electrical power used by the camera crane provided at least indirectly from the battery pack assembly; and
   the battery pack assembly provided as an accessory, the battery pack assembly supported on a surface of the chassis, and the battery pack assembly removable from the chassis.

* * * * *